(12) United States Patent
Cederlof

(10) Patent No.: US 9,268,520 B1
(45) Date of Patent: Feb. 23, 2016

(54) ALTERING CONTENT PROJECTION

(75) Inventor: Colter E. Cederlof, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1018 days.

(21) Appl. No.: 13/165,579

(22) Filed: Jun. 21, 2011

(51) Int. Cl.
*G06F 3/16* (2006.01)

(52) U.S. Cl.
CPC ........................................ *G06F 3/16* (2013.01)

(58) Field of Classification Search
CPC ........... G06F 3/017; G06F 3/01; G06F 3/011; G06F 3/013; G06F 3/03; G06F 3/005; G06F 3/0346; G06F 3/041; G06F 3/0304; G06F 3/0325; G06F 3/012; G06F 3/016; G06F 3/033; G06F 3/044; G06F 3/167; G06F 2203/04806
USPC .......... 345/156; 382/118, 108, 115, 318, 173; 353/28, 122, 97; 348/586, 590, 607
See application file for complete search history.

(56) References Cited

U.S. PATENT DOCUMENTS

| | | | | |
|---|---|---|---|---|
| 6,460,999 | B1* | 10/2002 | Suzuki ............................ | 353/79 |
| 8,532,340 | B2* | 9/2013 | Kruglick ...................... | 382/108 |
| 2005/0117132 | A1* | 6/2005 | Agostinelli ................... | 353/122 |
| 2006/0028624 | A1* | 2/2006 | Kaise et al. ..................... | 353/85 |
| 2006/0170871 | A1* | 8/2006 | Dietz et al. ...................... | 353/31 |
| 2009/0097697 | A1* | 4/2009 | Miyake ......................... | 382/100 |
| 2010/0177929 | A1* | 7/2010 | Kurtz et al. ................... | 382/103 |
| 2010/0209007 | A1* | 8/2010 | Elyada et al. ................. | 382/218 |
| 2012/0082383 | A1* | 4/2012 | Kruglick ....................... | 382/195 |
| 2012/0194517 | A1* | 8/2012 | Izadi et al. .................... | 345/420 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Olga Merkoulova
(74) *Attorney, Agent, or Firm* — Lee & Hayes, PLLC

(57) ABSTRACT

Systems and techniques for determining when content is being projected onto a predefined surface and, in response, altering the projection are described herein. For instance, the systems may project content onto one or more surfaces of an environment. The content may comprise electronic books, images, videos, animations, interactive menus, and/or any other type of visual content. While projecting the content, the systems projecting the content may determine when some or all of the content is projected onto a predefined surface, either due to the system dynamically projecting the content throughout different locations and surfaces in the environment, due to the predefined surface moving within the environment, or a combination thereof. When the systems determine that all or a portion of the content is being projected onto a predefined surface, the systems may alter the projection of content by dimming the content, altering a location of the projection, or the like.

36 Claims, 7 Drawing Sheets

ALTERING CONTENT PROJECTION

BACKGROUND

Augmented reality environments allow interaction among users and both real-world objects and virtual or digital objects. To achieve these augmented reality environments, some systems may project content onto walls or other physical objects within an environment. While projecting digital content onto these real-world objects may create interesting visual environments, users within these environments that accidentally look into the projection may experience discomfort due to the intense brightness of the projection.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
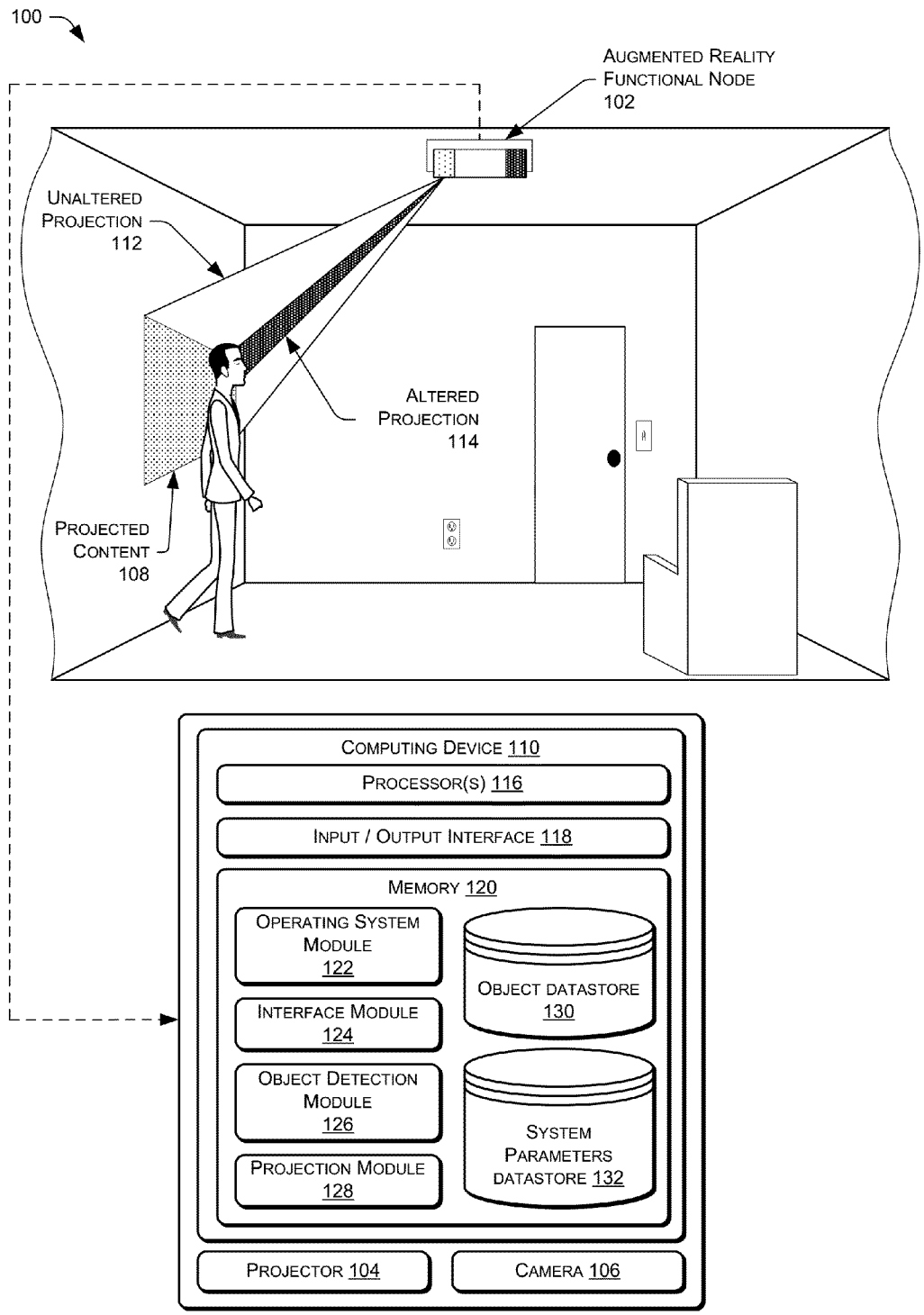
FIG. 1 illustrates an environment that includes an augmented reality functional node (ARFN) that projects content onto a surface in the environment. In this example, the ARFN detects that a portion of the content is being projected onto the face of a user within the environment and, in response, the ARFN dims the projection associated with this portion of the projection.

This document describes, in part, systems and techniques for determining when content is being projected onto a predefined surface and, in response, altering the projection. For instance, systems described herein may project content onto one or more surfaces of an environment. The content may comprise electronic books, images, videos, animations, interactive menus, and/or any other type of visual content. While projecting the content, the systems projecting the content may determine when some or all of the content is projected onto a predefined surface, either due to the system dynamically projecting the content throughout different locations and surfaces in the environment, due to the predefined surface moving within the environment, or a combination thereof. When the systems determine that all or a portion of the content is being projected onto a predefined surface, the systems may alter the projection of the content by dimming the content, altering a location of the projection, or the like. In addition, the systems may alter one or more environmental conditions within the environment, such as ambient light. For instance, these systems may dim or brighten other lights within the environment.

In one example, the predefined surface comprises a user within the environment or a portion of the user, such as an upper torso, head, face, or eyes of the user. In one such example, the systems described below may determine whether content is being projected into the eyes of the user. If so, then the systems may dim some or all of the projected content. For instance, the systems may identify which pixels of the projection are being projected into the user's eyes and may turn the value of these pixels to black. By doing so, the user is not blinded or otherwise bothered by bright light being projected into the user's eyes. In addition, because in this example the user's face resides between the system projecting the content and the projection surface behind the user, the dimming of the subset of pixels does not adversely affect the projection of the content itself. That is, since the user's head is already casting a shadow onto the projection surface, turning the pixels aimed at the user's eyes to black will not change the projection of the content on the original projection surface.

While the systems described below may turn these pixels to black in some instances, in other instances the system may alter the projection in another manner. For instance, the systems may cease projection of the content entirely, physically change a location at which the content is being projected, dim the entire content, dim a portion of or an entire light source of the projector, brighten a portion of or the entire content, brighten the light source, or alter the projection in any other manner.

In some instances, the systems may select how to alter the projection based on one or more criteria. For instance, the systems may identify characteristics of a user onto which the content is being projected and may alter the projection with reference to one or more of these characteristics. For instance, the system may identify a height and/or age of the user. If the user is determined to be tall and/or an adult, then the system may simply turn the pixels to black. If, however, the user is determined to be short and/or a child, then the system may instead turn off the projection altogether. The selection of which alteration to employ may also be based on predefined user preferences, a class of content being projected (e.g., a video, image, book, etc.), an identified distance between the projector projecting the content and the user, a day of the week or a time of the projection, and/or any other factors.

Furthermore, while the predefined surface may comprise a face or other portion of the user, in other instances this surface may instead comprise other physical objects within the environment. For instance, the predefined surface may comprise a pillow of the user. In this example, the systems may dynamically project content onto varying locations around the environment. However, the systems may be configured to identify a pillow of the user and dim pixels projected onto the pillow in response. By doing so, the systems help ensure that a user who positions their head onto the pillow is not inconvenienced with bright light being shown into the user's eyes. Of course, while one object has been discussed, the predefined surfaces may comprise any other surface or object with the environment, such as walls, chairs, televisions, or the like.

In some instances, the systems described below include a projector to project content within an environment, a camera to capture information to identify the predefined surfaces, and logic to identify the predefined surfaces and alter the projection with use of the information captured by the camera. In instances where the predefined surface comprises a head, face, or eyes of a user, the camera and the logic may utilize facial recognition, depth sensing, and/or other techniques for identifying a user within the environment. In addition, the logic may track the location of the projection. In response to determining that the content is being projected onto a face of the user, the logic may accordingly alter the projection.

In other instances, the projector projects a non-visible structured light pattern in addition to the visible content. In these instances, the camera may read the structured light pattern to identify distortions therein caused by objects within the environment. The camera and/or the logic may then identify surfaces or objects from these distortions for the purpose of identifying a predefined surface. Again, the logic may alter the projection of the content in response to identifying such a predefined surface. In some instances, the systems may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

As described herein for illustration and not by way of limitation, the projector and the camera may be incorporated into a single unit, designated as an augmented reality functional node (ARFN) in some instances. In other implementations, other combinations of elements such as projectors, cameras, microphones, ultrasound transducers, depth sensing cameras, weight sensors, touch sensors, tactile output devices, and so forth may be also be present within or coupled to the ARFN. For convenience, and not by way of limitation, some of the examples in this disclosure refer to the use of structured light for the characterization of the physical environment of the scene including objects therein. However, in addition to or in place of structured light, other techniques may be used such as facial recognition techniques, depth sensing techniques, light detection and ranging (LIDAR), optical time-of-flight, ultrasonic ranging, stereoscopic imaging, radar, and so forth either alone or in combination with one another.

Example Environment

FIG. 1 shows an illustrative augmented reality environment 100 that includes an augmented reality functional node (ARFN) 102 that may be configured to perform the techniques described above. While the environment illustrates a single node, in some instances an environment may include multiple different nodes stationed in different locations throughout the environment. The ARFN 102 may include one or more projectors 104 that, when active, project content onto any surface within the environment 100, thereby generating an augmented reality environment that may incorporate real-world objects within the environment 100. The projected content may include electronic books, videos, images, interactive menus, or any other sort of visual content.

For instance, the user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a virtual remote control to operate a television within the environment 100. As discussed below, the ARFN 102 may include one or more cameras 106 that may capture images of the illustrated user operating the remote control and, in response, the ARFN 102 may operate the television according to the interactions between the user and the projected control. While a few examples have been given, it is to be appreciated that the ARFN 102 may project any other sort of content within the environment 100.

In the illustrated example, the projector 104 of the ARFN 102 projects content 108 onto a wall of the environment 100. However, in this example a user within the environment 100 occludes a portion of the projected content. That is, as illustrated, the user resides between a projection path of the projector 104 and the projection surface and, hence, a portion of the projected content is being projected onto the user rather than on the wall of the environment.

Using techniques described below, the camera 106 may capture information sufficient to identify the user's presence between this projection path and the projection surface and, at least partly in response, logic within a computing device 110 of the ARFN 102 may alter the projection of the content in some manner. In the illustrated example, for instance, the computing device 110 dims a portion of the pixels (e.g., turns off, turns to black, etc.) that correspond to the content that is currently being projected into or adjacent the eyes of the illustrated user. As such, the ARFN 102 is shown to project unaltered content 112, as well as altered content 114 comprising the dimmed pixels. By dimming the pixels associated with the content being projected into the eyes of the user, the ARFN 102 prevents bright light of the projection from being shown directly into the eyes of the user.

As illustrated, the computing device 110 includes one or more processors 116, an input/output interface 118, and memory 120. The processors 116 may be configured to execute instructions, which may be stored in the memory 120 or in other memory accessible to the processors 116.

Figure 2:
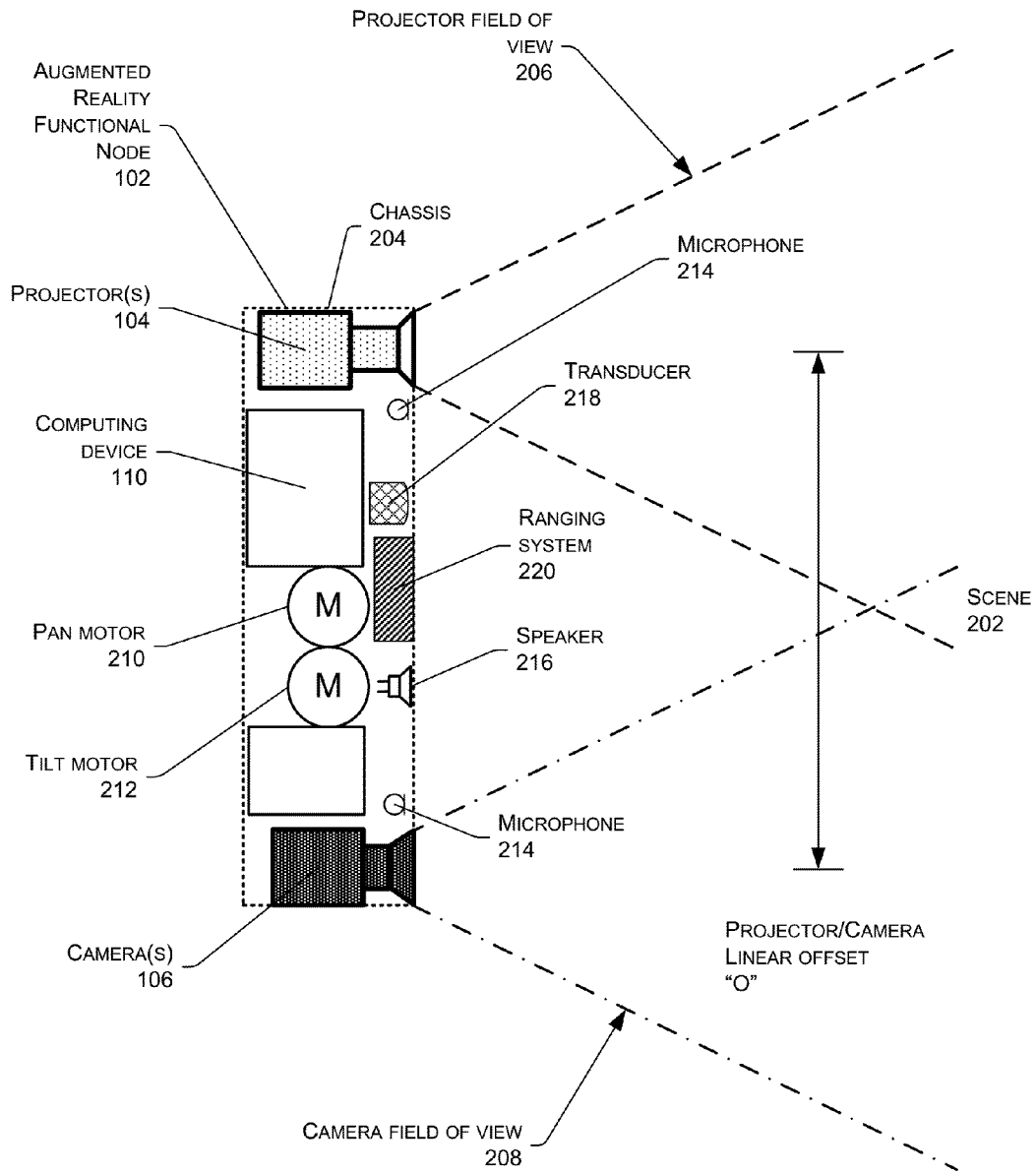
FIG. 2 illustrates an example ARFN that includes a computing device, a projector, a camera, and other selected components for altering the projecting of content, as illustrated in FIG. 1 and as described below.

The input/output interface 118, meanwhile, may be configured to couple the computing device 110 to other components of the ARFN 102, such as the projector 104, the camera 106, microphones, other ARFNs 102, other computing devices, and so forth. The coupling between the computing device 110 and the devices may be via wire, fiber optic cable, wireless connection, or the like. Furthermore, while FIG. 1 illustrates the computing device 110 as residing within a housing of the ARFN 102, some or all of the components of the computing device 110 may reside at another location that is operatively connected to the ARFN 102. In still other instances, certain components, logic, and/or the like of the computing device 110 may reside within the projector 104 or the camera 106. Therefore, it is to be appreciated that the illustration of the ARFN 102 of both FIGS. 1 and 2 is for illustrative purposes only, and that components of the ARFN 102 may be configured in any other combination and at any other location.

The memory 120, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD")

or other optical disk storage, magnetic cassettes, magnetic tape, magnetic disk storage or other magnetic storage devices, or any other medium which can be used to store the desired information and which can be accessed by a computing device 110. The memory 120 may reside within a housing of the ARFN, on one or more storage devices accessible on a local network, on cloud storage accessible via a wide area network, or in any other accessible location.

The memory 120 may store several modules, such as instructions, datastores, and so forth that are configured to execute on the processors 116. For instance, the memory 120 may store an operating system module 122, an interface module 124, an object detection module 126, a projection module 128, an object datastore 130, and a system parameters datastore 132.

The operating system module 122 may be configured to manage hardware and services within and coupled to the computing device 110 for the benefit of other modules. The interface module 124, meanwhile, may be configured to receive and interpret commands received from users within the environment 100. For instance, the interface module 124 may analyze and parse images captured by the camera 106 to identify gestures made by users within the environment 100. In response to identifying a predefined gesture, the interface module 124 may interpret the gesture and cause the ARFN 102 to perform a corresponding action. For instance, if a user within the environment 100 makes a gesture requesting that the ARFN project a certain piece of content, then the interface module 124 may interpret the gesture and cause the projection module 128 to project the content via the projector 104. In other instances, the interface module 124 identifies commands audibly issued by users within the environment and captured by one or more microphones of the ARFN 102. In still other instances, the interface module 124 allows users to interface and interact with the ARFN 102 in any way, such as via physical controls, and the like.

The object detection module 126, meanwhile, functions to analyze the environment 100 based on images captured by the camera 106 for the purpose of identifying predefined surfaces and objects within the environment. For instance, the object detection module 126 may utilize information captured by the camera 106 along with information about objects stored in the object datastore 130 to identify one or more predefined surfaces or objects. In response to identifying such a predefined surface, the object detection module 126 may notify the projection module 128, which may alter the projection of the content as described above.

Figure 3:
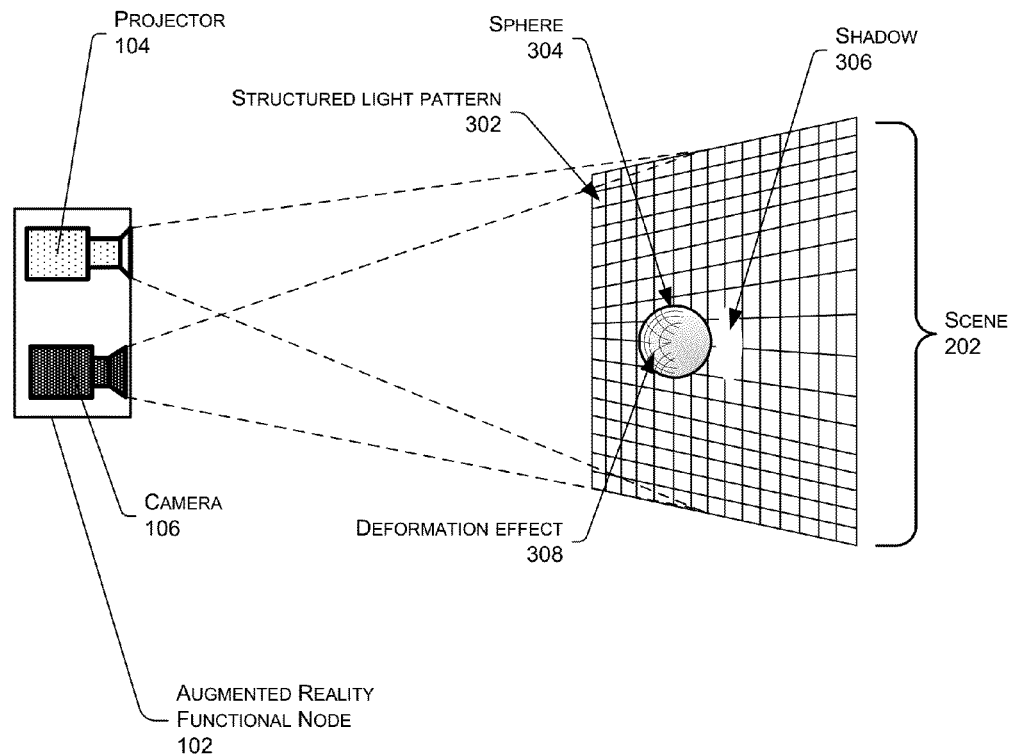
FIG. 3 is an illustrative diagram of the ARFN using structured light to identify surfaces and objects within an environment. By identifying predefined surfaces in this manner, the ARFN is able to determine when to alter a projection.

The object detection module 126 may employ one or a variety of techniques to identify predefined surfaces or objects. For instance, in instances where the projector 104 projects a structured light pattern, the object detection module 126 may attempt to identify distortions in the structured light pattern caused by objects within the environment 100, as imaged by the camera 106. FIG. 3 describes these techniques in further detail.

Additionally or alternatively, the object detection module 126 may utilize one or more facial recognition and/or depth sensing techniques in instances where the predefined surface comprises a face, head, or eyes of the user. For instances, the object detection module may identify a face of a user with reference to three-dimensional images, landmark features (e.g., eyes, nose, jaw, etc.), skin texture analysis, and/or with reference to any other information captured by the camera 106.

Once the object detection module 126 detects a predefined surface as indicated by the object datastore 130, the module 126 may provide this indication to the projection module 128. In response, the projection module 128 may alter the projection of the content via the projector 104. As discussed above, the projection module 128 may dim pixels of the projection associated with the content being projected onto the predefined surface by, for instance, turning this pixels to gray, black, or another color, or by turning off the projection of these pixels altogether. Alternatively, the projection module 128 may dim the entire projection of the content. In still other instances, the module 128 may dim (e.g., turn down or turn off) a portion of a light source of the projector 104 corresponding to the pixels associated with the content that is being projected on the predefined surface, or may dim the entire light source. In yet other instances, the projector 104 may be configured to physically block the projection of the content corresponding to the predefined surface (e.g., the eyes of the illustrated user).

In contrast to dimming the content, meanwhile, in some instances the projection module 128 may brighten a portion of or the entire projected content. For instance, the projection module 128 may turn each pixel of the content or each pixel associated with the portion of the content on the predefined surface to white, thereby effectively creating a spotlight on the predefined surface.

Furthermore, in addition or in the alternative to the above, in some instances the projection module 128 may alter a location at which the projector 104 projects the content. As described in detail below, the ARFN 102 may include functionality to allow the projector to project content at different areas within the environment 100. As such, the projection module 128 may instruct the projector 104 to alter the location of the projection such that the content is no longer being projected onto the predefined surface. In the illustrated example, for instance, the projector may move the projected content 108 onto a different surface (e.g., a different wall or portion of the current wall, onto the floor, etc.) in response to the object detection module 126 determining that the content is being projected into the eyes of the user. In doing so, the projection module 128 may refrain from dimming or otherwise altering the substance of the projection.

Finally, the memory 120 may store the system parameters datastore 132, which is configured to maintain information about the state of the computing device 110, the projector 104, the camera 106, and so forth. For example, and as described in detail below, the ARFN 102 may be configured to pan and tilt for the purpose of allowing the projector 104 and the camera 106 access different projection surfaces in the environment 100. As such, the system parameters maintained in the datastore 132 may include current pan and tilt settings of the camera and projector, an indication of content that the ARFN 102 is currently projecting or otherwise outputting, and the like.

Example ARFN

FIG. 2 shows additional details of an example ARFN 102 that may be configured to determine when content is being projected onto a predefined surface and, in response, alter the projection, as described above with reference to FIG. 1. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. One or more projectors 104 may be disposed within the chassis 204 and may be configured to generate and project images into the scene 202. These images may be visible light images perceptible to the user, visible light images imperceptible to the user, images with non-visible light, or a combination thereof. This projector 104 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 104 has a projector field of view 206 which describes a particular solid angle. The projector field of view 206 may vary according to changes in the configuration of the projector. For example, the projector field of view 206 may narrow upon application of an optical zoom to the projector.

One or more cameras 106 may also be disposed within the chassis 204. The camera 106 is configured to image the scene in visible light wavelengths, non-visible light wavelengths, or both. The camera 106 has a camera field of view 208 that describes a particular solid angle. The camera field of view 208 may vary according to changes in the configuration of the camera 106. For example, an optical zoom of the camera may narrow the camera field of view 208.

In some implementations, a plurality of cameras 106 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 104 and/or the camera 106. For example, in one implementation the actuator may comprise a pan motor 210, a tilt motor 212, and so forth. The pan motor 210 is configured to rotate the chassis 204 in a yawing motion. The tilt motor 212, meanwhile, is configured to change the pitch of the chassis 204. By panning and/or tilting the chassis 204, different views of the scene may be acquired.

One or more microphones 214 may be disposed within the chassis 204, or elsewhere within the scene 202. These microphones 214 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 216 may also be present to provide for audible output. For example, the speakers 216 may be used to provide output from a text-to-speech module or to playback pre-recorded audio.

A transducer 218 may be present within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 220. The ranging system 220 is configured to provide distance information from the ARFN 102 to a scanned object or set of objects. The ranging system 220 may comprise radar, light detection and ranging (LIDAR), ultrasonic ranging, stereoscopic ranging, and so forth. In some implementations the transducer 218, the microphones 214, the speaker 216, or a combination thereof may be configured to use echolocation or echo-ranging to determine distance and spatial characteristics.

In this illustration, the computing device 110 is shown within the chassis 204. However, in other implementations all or a portion of the computing device 110 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 104 and the camera 106. Placement of the projector 104 and the camera 106 at distance "O" from one another may aid in the recovery of structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 104 and the camera 106 relative to the chassis 204 may vary.

In other implementations, the components of the ARFN 102 may be distributed in one or more locations within the environment 100. As mentioned above, microphones 214 and speakers 216 may be distributed throughout the scene. The projector 104 and the camera 106 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

FIG. 3 is an illustrative diagram of the ARFN 102 using structured light to identify surfaces and objects within an environment. In some instances, the ARFN 102 may use structured light in this manner to identify depths and/or dimensions of objects within a particular scene 202 for the purposes of identifying particular objects or surfaces. For instance, the ARFN 102 may use this structured light to identify heads, faces, and/or eyes of users within the scene 202 for the purpose of altering a projection of content. However, while the structured light techniques described herein provide one example for identifying objects and surfaces within a scene, it is to be appreciated that this information may be determined in any other manner in other embodiments.

In this instant illustration, the projector 104 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 106 used to detect the structured light may also be incorporated into bulbs or assemblies suitable for installation in existing light fixtures. These assemblies may be configured to communicate with the computing device 110 wirelessly or via transmission of a signal via the household electrical wiring. In some implementations, the assembly may provide pre-processing of input prior to sending data along to the computing device 110.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom noise (PN) patterns are useful as structured light patterns because a particular point within the PN pattern may be specifically identified. A PN function is deterministic in that given a specific set of variables, a particular output is defined. This deterministic behavior allows the specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 104 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302 may be used to provide information on the topology of the scene. Where the projector 104 and camera 106 have differing fields of 4 view, such as shown in FIG. 2, the dispersion or change in the "density" of the structured light pattern 302 may be used to determine depth of field.

The camera 106 detects the interaction of the structured light pattern 302 with objects within the scene. For example, the deformation effect 308 on the sphere 304 is detected by the camera 106. The camera 106 is configured to sense or detect the structured light. In some implementations the camera 106 may also sense or detect wavelengths other than those used for structured light pattern 302. The image captured by the camera 106 may be processed by the object detection module 126 to identify predefined surfaces (e.g., user faces, predefined physical objects, etc.) within the scene 202. In some implementations, multiple cameras may be used to acquire the image.

The actual size of the sphere 304 in this example may not be readily determined based upon the geometry of the ARFN 102, diameter of the sphere 304, distance between the ARFN 102 and the sphere 304, and so forth. As a result, the object detection module 126 may be configured to make one or more assumptions about the scene, and test those assumptions to constrain the dimensions of the scene 202.

As mentioned above, the structured light pattern 302 may be projected using light that is visible to the user, non-visible to the user, or a combination of the two. Non-visible light offers the advantage of allowing the structured light pattern 302 to be projected onto the scene 202 while remaining undetectable to the user. Non-visible light, however, may require special equipment or adaptations to the equipment to generate and modulate the non-visible light. For example, an image projector may incorporate a color wheel with segments configured to pass infrared light as well as visible light wavelengths.

Structured light patterns 302 may also be generated using wavelengths visible to the user. Visible wavelength structured light allows the use of existing image projection and image acquisition hardware. Visible wavelength structured light also allows for color characterization of objects. For example, primary color structured light patterns may be used to determine absorption and reflection of the primary color on objects within the scene. This color characterization may be utilized in some implementations to color correct for projection of an image onto a surface. For example, an image projected by the ARFN 102 onto a yellow writing pad may be color corrected to account for the yellow color of the pad.

While structured light patterns using visible light wavelengths are useful in characterizing the scene, they may be distracting or otherwise undesirable to users. Thus, generation and use of structured light patterns 302 that use visible light wavelengths yet are imperceptible may be beneficial.

Example Alterations of Projected Content

Figure 4:
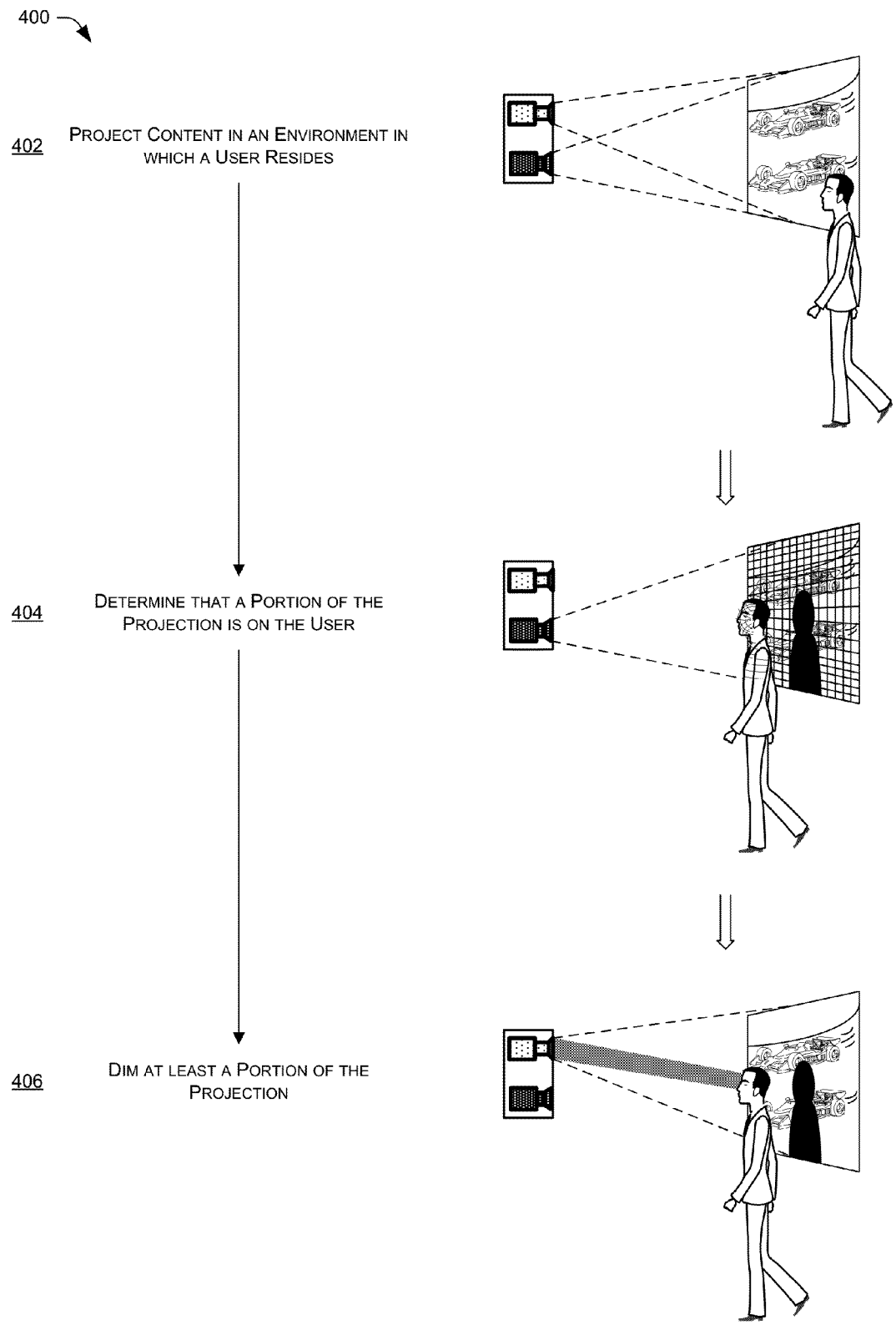
FIG. 4 illustrates an example process of projecting content within an environment, identifying that a portion of the projection is on a user within the environment, and, in response, dimming the portion of the projection.

FIG. 4 illustrates an example process 400 of altering the projection of content within an environment, such as the environment 100, as described above. The process 400 includes, at 402, projecting content in an environment in which a user resides. As described above, an ARFN 102 or another projection system may project content onto a wall, table, or other projection surface. This content may comprise a movie, image, animation, book, or any other form of visual content.

At 404, the process 400 identifies that a portion of the projection is on the user within the environment. For instance, the ARFN 102 may identify that a portion of the content is being projected onto a predefined portion of the user, such as the user's head, face, or eyes. As described above, the ARFN 102 may make this determination using facial recognition techniques, structured light techniques, or the like. In the illustrated example, the projector is shown projecting structured light onto substantially the same region as where the projector projects the content. The camera of the ARFN 102, meanwhile, captures images of this structured light to identify deformations within the light. In this example, the camera and the corresponding logic described above may identify, via deformation of the structured light, that a portion of the content being projected is being projected onto the user's head and face and, hence, into the user's eyes.

At 406, and in response, the process 400 alters the projection of the content by dimming the portion of the projection that is being projected onto the user's face and/or eyes. For instance, the ARFN 102 may identify pixels that are associated with the content being projected onto the user's eyes and may turn the value of these pixels to black, and/or may otherwise dim the projection as described above (e.g., by turning off these pixels, brightening the pixels, etc.). In some instances, the ARFN 102 may dim the entire projection or any amount of the projection between the portion being projected onto the user's face and the entire projection. In each of these instances, when the ARFN 102 determines that the projection is no longer on the pre-specified portion of the user (e.g., because the user has moved to another location within the environment, because the ARN 102 has moved the projection to a different location in the environment, etc.), the ARFN 102 may cease the alteration (e.g., dimming) of the projection.

Furthermore, or in the alternative, the ARFN 102 may alter other environmental conditions within the environment. For instance, when the ARFN 102 communicatively couples to light sources within the illustrated room, the ARFN 102 may selectively brighten and/or dim these light sources in response to determining that the ARFN 102 is projecting content onto the pre-specified portion of the user (or other pre-specified surfaces, as in other embodiments described herein).

Figure 5:
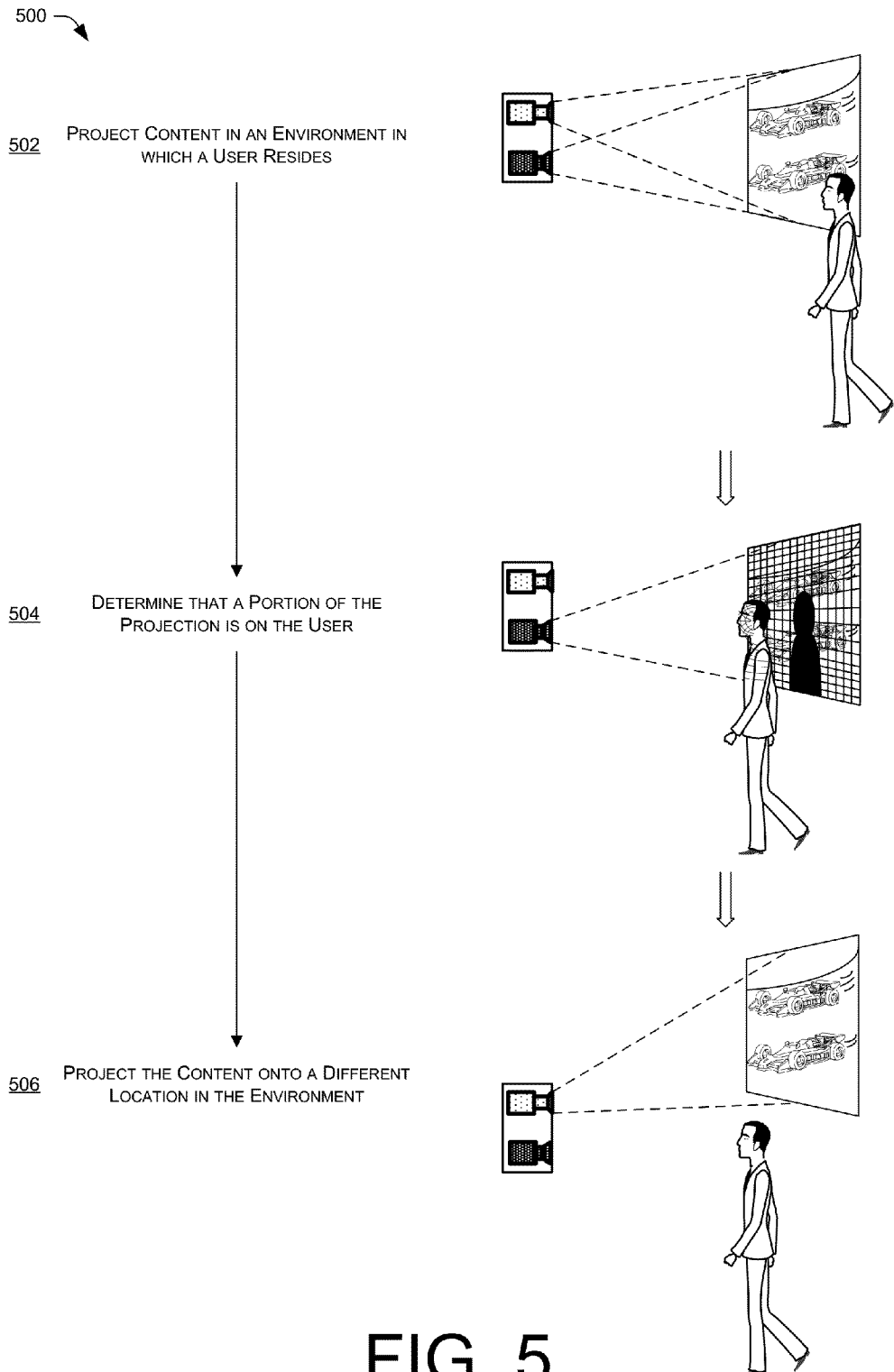
FIG. 5 illustrates an example process of projecting content within an environment, identifying that a portion of the projection is on a user within the environment, and, in response, projecting the content onto a different location within the environment.

FIG. 5 illustrates another example process 500 of altering the projection of content as described herein. At 502, the process 500 again projects content within an environment, while at 504 the process 500 identifies that a portion of the projection is on a user within the environment. In response, however, at 506 the process 500 alters the projection by projecting the content onto a different location within the environment. That is, rather than (or in addition to) dimming the projection, the ARFN 102 may utilize the pan and tilt motors or other functionality to alter a location within the environment where the projection is being displayed. By doing so, the user avoids the blinding effect caused by the intense brightness of the projection aimed at the user's eyes.

Figure 6:
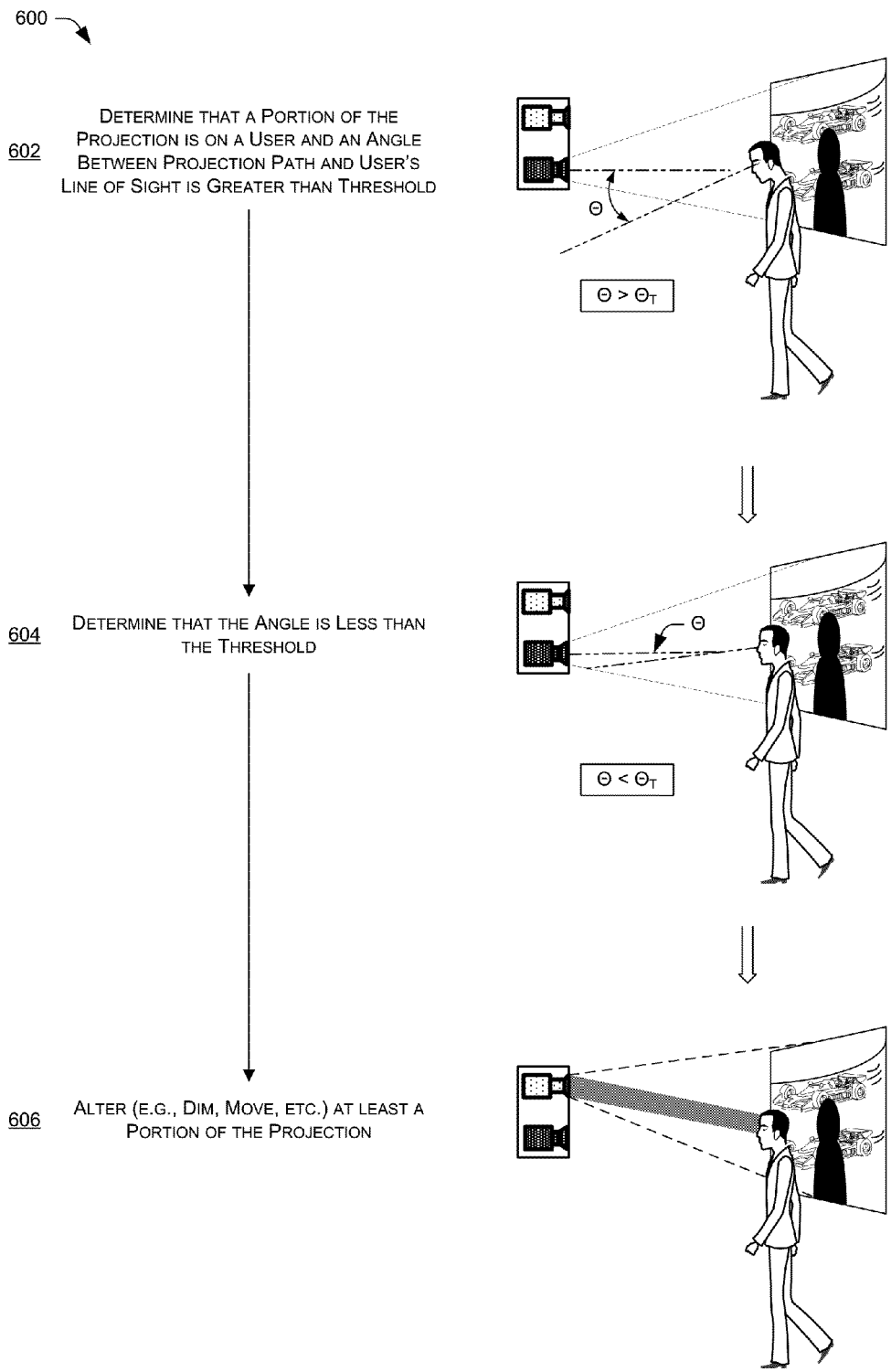
FIG. 6 illustrates an example process of altering projection of content in response to determining both that a portion of the content is being projected onto the user and that a line of sight of the user is within a threshold angle of a projection path of the projection.

FIG. 6 illustrates an example process 600 of altering projection of content in response to determining not only that a portion of the content is being projected onto the user, but also that a line of sight of the user is within a threshold angle of a projection path of the projection.

The process 600 includes, at 602 and similar to the processes described above, determining that a portion of a projection is on a pre-specified portion of a user (e.g., the head, face, or eyes of the user). The process also determines, at 602, that an angle between a projection path of the content and a line of sight of the user is greater than a threshold angle. That is, the ARFN 102 may first maintain and store an indication of a projection path from which the projection of the ARFN 102 is projecting content. In addition, the ARFN 102 may utilize the facial recognition, structured light, or other techniques to identify a current line of sight of the user. For instance, the ARFN 102 may identify an orientation of the user's head and, with this information, may deduce a line of sight of the user. The AFRN 102 may then compute an angle between the projection path and the line of sight before comparing this angle with a predefined threshold angle. This threshold angle may be a default angle, may be a user-configurable angle, or may be an angle that is calculated in any other manner and/or with reference to any other variables (e.g., a location of the ARFN 102, environmental conditions, etc.).

In the instant example, at 602 the process 600 may determine that the current angle is greater than the threshold angle, meaning that the user is not staring directly into the projection path and, therefore, is not staring directly into the intense light of the projection. As such, the ARFN 102 may refrain from altering the projection of the content, despite having identified that a portion of the content is being projected onto the face of the user.

At 604, however, the process 600 determines that the angle computed above is now less than the threshold. That is, the ARFN 102 has now determined that either or both of the projection path and the line of sight of the user has changed and, further, that the angle there between is less than the threshold angle. As such, the user is now starting directly or nearly directly into the projection of the content.

In response, at 606 the process 600 alters the projection of the content as described above. For instance, the ARFN 102 may dim a portion of or the entire projection, may alter a location of the projection, or the like.

Example Process

Figure 7:
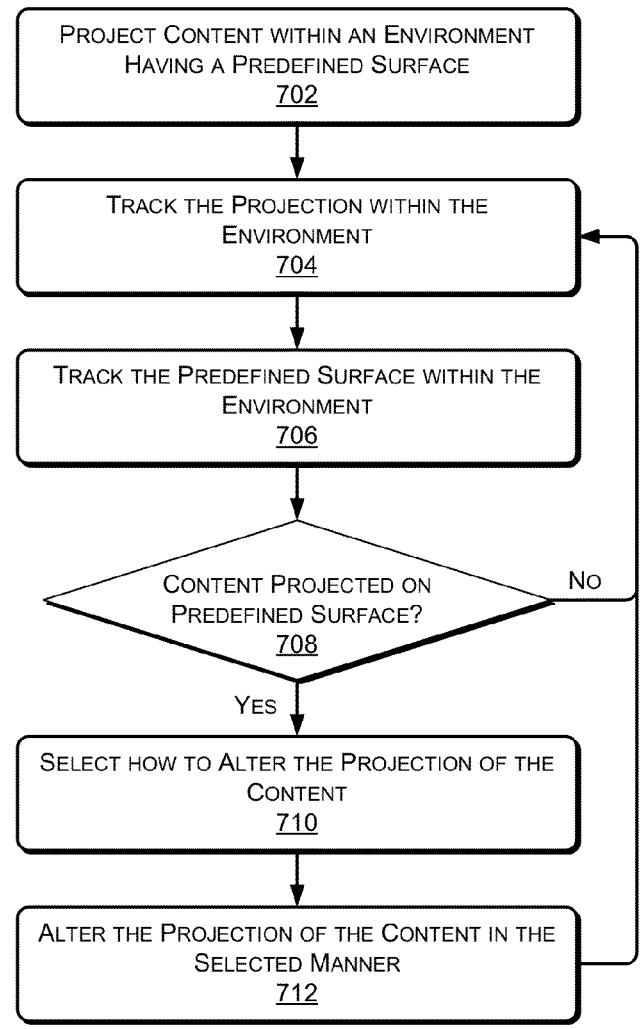
FIG. 7 illustrates an example process for altering projection of content in response to determining that the content is being projected onto a predefined surface.

FIG. 7 illustrates an example process 700 for altering projection of content in response to determining that the content is being projected onto a predefined surface. The process 700 (as well as other processes described in this disclosure) may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

The process 700 includes, at 702, projecting content within an environment having a predefined surface. The predefined surface may comprise a user, a pre-specified portion of a user, a physical object (e.g., a pillow, table, window, etc.), or any other surface. At 704, the process 700 tracks the projection of the content within the environment. For instance, an ARFN 102 may project content dynamically across multiple surfaces within the environment and may track the current location of the projection as it changes.

At 706, the process may also track the predefined surface within the environment, since this surface may be mobile in some instances. For instance, the ARFN 102 may track the location of a user within the environment via the camera of the ARFN 102, via voice recognition and audio information captured by microphones of the ARFN 102, and/or the like. In instances where the ARFN 102 utilizes a structured light pattern projected atop the protected visual content, the tracking of the predefined surface may comprise tracking the surface across the projected content if and when the surface (e.g., a user's face) is identified within the projection area.

At 708, the process 700 queries whether content is being projected onto the predefined surface. At least partly in response to determining that the predefined surface is indeed being projected upon, the process may, at 710, select how to alter the projection of the content. For instance, the process 700 may make this selection using the criteria described above, such as with reference to a height of a user (when the surface is a portion of a user), an age of the user, a preference of the user, a distance between the user and the projector, a type or class of content being projected, and/or any other criteria. At 712, the process 700 alters the projection of the content in the selected manner. This alteration may comprise any one or more of the example alterations described above.

If, however, the process 700 determines at 708 that the predefined surface is not being projected upon, the process 700 may refrain from altering the projection of the content. Instead, the process 700 may continue tracking the projection of the content and the location of the predefined surface within the environment.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
   one or more processors;
   a projector, coupled to the one or more processors and configured to project content in an environment;
   a camera, coupled to the one or more processors and configured to capture information for detecting a user in the environment; and
   one or more computer-readable media storing computer-executable instructions that, when executed by the one or more processors, cause the one or more processors to perform acts comprising:

determining, based at least in part on the information captured by the camera, when at least a portion of the projection is on at least one of an upper torso, a head, a face, or an eye of the user; and altering a location of the projection at least partly in response to the determining that the portion of the projection is on the at least one of the upper torso, the head, the face, or the eye of the user.

2. A system as recited in claim 1, wherein the projector is further configured to project a structured light pattern, and the determining comprises identifying distortion in the structured light pattern.

3. A system as recited in claim 1, the acts further comprising dimming the projection, wherein the dimming of the projection comprises dimming at least a portion of pixels of the projection that are on the at least one of the upper torso, the head, the face, or the eye of the user while refraining from dimming other pixels of the projection.

4. A system as recited in claim 1, the acts further comprising dimming the projection, wherein the dimming of the projection comprises setting a least a portion of pixels of the projection to black.

5. A system as recited in claim 1, the acts further comprising dimming the projection, wherein the dimming of the projection comprises ceasing the projection of the content.

6. A system as recited in claim 1, the acts further comprising dimming the projection, wherein the dimming of the projection comprises dimming a light source of the projector, the light source at least partly creating the projection of the content.

7. A system as recited in claim 1, the acts further comprising dimming the projection, wherein the dimming of the projection comprises ceasing projection of at least a portion of pixels that are on the at least one of the upper torso, the head, the face, or the eye of the user while refraining from ceasing projection of other pixels of the projection.

8. A system as recited in claim 1, the acts further comprising:
  dimming the projection;
  after the dimming of the projection, determining when the projection is free from projecting content on the at least one of the upper torso, the head, the face, or the eye of the user based at least in part on the information captured by the camera; and
  ceasing the dimming of the projection at least partly in response to determining that the projection is free from projecting content on the at least one of the upper torso, the head, the face, or the eye of the user.

9. One or more non-transitory computer-readable media storing computer-executable instructions that, when executed by one or more processors, cause the one or more processors to perform acts comprising:
  projecting content within an environment having a user residing therein;
  determining when the content is being projected onto a pre-specified portion of the user; and
  altering a location of the content at least partly in response to determining that the content is being projected onto the pre-specified portion of the user.

10. One or more non-transitory computer-readable media as recited in claim 9, the acts further comprising projecting structured light within the environment, and wherein the determining when the content is being projected onto the pre-specified portion of the user comprises analyzing distortions of the projected structured light.

11. One or more non-transitory computer-readable media as recited in claim 10, wherein the structured light and the content are projected within substantially the same region within the environment.

12. One or more non-transitory computer-readable media as recited in claim 9, wherein the determining comprises performing facial recognition techniques to recognize that the content is being projected onto the pre-specified portion of the user.

13. One or more non-transitory computer-readable media as recited in claim 9, wherein the pre-specified portion of the user comprises an upper torso, head, face, or eyes of the user.

14. One or more non-transitory computer-readable media as recited in claim 9, wherein the pre-specified portion of the user comprises any portion of the user.

15. One or more non-transitory computer-readable media as recited in claim 9, the acts further comprising dimming the content.

16. One or more non-transitory computer-readable media as recited in claim 15, wherein the diming of the content comprises dimming the entire content.

17. One or more non-transitory computer-readable media as recited in claim 15, wherein the diming of the content comprises dimming at least a portion of the content being projected onto the pre-specified portion of the user while refraining from dimming another portion of the content.

18. One or more non-transitory computer-readable media as recited in claim 15, wherein the diming of the content comprises changing a color of pixels of the content, turning off pixels of the content, blocking pixels of the content, turning down a light source that at least partly creates the projecting, or turning off the light source.

19. One or more non-transitory computer-readable media as recited in claim 9, wherein the altering the location of the content comprises altering the location of the content such that the content is free from being projected onto the pre-specified portion of the user.

20. One or more non-transitory computer-readable media as recited in claim 9, the acts further comprising brightening the content.

21. One or more non-transitory computer-readable media as recited in claim 20, wherein the brightening of the content comprises brightening the entire content.

22. One or more non-transitory computer-readable media as recited in claim 20, wherein the brightening of the content comprises brightening a portion of the content being projected onto the pre-specified portion of the user while refraining from brightening another portion of the content.

23. One or more non-transitory computer-readable media as recited in claim 9, wherein the environment includes a light source that is separate from a projector projecting the content, and the acts further comprising dimming or brightening the light source at least partly in response to determining that the content is being projected onto the pre-specified portion of the user.

24. One or more non-transitory computer-readable media as recited in claim 9, wherein the pre-specified portion of the user comprises an upper torso head, face, or eyes of the user, and the acts further comprising:
  determining a line of sight of the user within the environment and a projection path of the content being projected; and
  determining when the line of sight is within a threshold angle of the projection path;
  and wherein the altering the projecting of the content is also based at least in part on determining that the line of sight is within the threshold angle.

25. One or more non-transitory computer-readable media as recited in claim 9, the acts further comprising selecting, from multiple different alternatives, how to alter the projecting of the content prior to the altering, the selecting being based on one or more criteria.

26. One or more non-transitory computer-readable media as recited in claim 25, wherein the one or more criteria comprise a height of the user in the environment, an age of the user, a preference of the user, a distance between a projector projecting the content and the user, or a class of content being projected.

27. One or more non-transitory computer-readable media as recited in claim 25, wherein the multiple different alternatives include two or more of:
dimming or brightening pixels of the content;
turning off pixels of the content;
blocking pixels of the content;
dimming or brightening a light source that at least partly creates the projecting;
turning off the light source; and
projecting the content onto a location other than the pre-specified portion of the user.

28. A method comprising:
under control of one or more computer systems configured with specific executable instructions,
projecting content within an environment;
determining, while projecting, whether or not the content is being projected onto a predefined surface; and
at least partly in response to determining that the content is being projected onto the predefined surface, altering a location of at least a portion of the content.

29. A method as recited in claim 28, further comprising:
identifying a group of pixels associated with the projecting of the content onto the predefined surface;
dimming the identified group of pixels; and
refraining from dimming pixels other than the identified group of pixels.

30. A method as recited in claim 28, further comprising:
identifying a group of pixels associated with the projecting of the content onto the predefined surface;
dimming the identified group of pixels; and
refraining from dimming pixels of the content at least partly in response to determining that the content free from projection onto the predefined surface.

31. A method as recited in claim 28, wherein the predefined surface comprises an upper torso head, face, or eyes of a user.

32. A method as recited in claim 28, wherein the predefined surface comprises an upper torso, head, face, or eyes of a user, and wherein the head, face or eyes of the user are identified and tracked within the environment.

33. A method as recited in claim 28, wherein the predefined surface is a physical object other than a user.

34. A method as recited in claim 28, further comprising tracking the predefined surface within the environment, and wherein the determining is based at least in part on the tracking.

35. A method as recited in claim 28, wherein the projecting comprises dynamically projecting the content across multiple different surfaces within the environment, and further comprising tracking the projecting of the content across the multiple different surfaces to determine whether the content is being projected onto the predefined surface.

36. A method as recited in claim 28, wherein the projecting comprises dynamically projecting the content across multiple different surfaces within the environment, and further comprising:
tracking the projecting of the content across the multiple different surfaces; and
tracking the predefined surface within the environment;
and wherein the determining that the content is being projected onto the predefined surface is based at least on the tracking of the projecting of the content and the tracking of the predefined surface.

* * * * *